(No Model.) 2 Sheets—Sheet 1.

D. T. BOYLE.
AUTOMATIC HOSE REEL.

No. 357,900. Patented Feb. 15, 1887.

Witnesses.
Inventor:
Daniel T. Boyle
By Wm H Lotz
Atty.

(No Model.) 2 Sheets—Sheet 2.

D. T. BOYLE.
AUTOMATIC HOSE REEL.

No. 357,900. Patented Feb. 15, 1887.

Witnesses
N. Rossiter
Anton Schoeninger

Inventor,
Daniel T. Boyle
By Wm H Lotz
Atty.

N. PETERS, Photo-Lithographer, Washington, D. C.

UNITED STATES PATENT OFFICE.

DANIEL T. BOYLE, OF CHICAGO, ILLINOIS, ASSIGNOR OF ONE-HALF TO EDWARD S. McDONALD, OF SAME PLACE.

AUTOMATIC HOSE-REEL.

SPECIFICATION forming part of Letters Patent No. 357,900, dated February 15, 1887.

Application filed April 16, 1886. Serial No. 199,154. (No model.)

*To all whom it may concern:*

Be it known that I, DANIEL T. BOYLE, a citizen of the United States of America, residing at Chicago, in the county of Cook and State of Illinois, have invented certain new and useful Improvements in Automatic Hose-Reels, of which the following is a specification, reference being had therein to the accompanying drawings.

This invention relates to devices for coiling hose that is connected with the stand-pipe in buildings in such a manner that it is instantly ready for immediate use and that, on removing the hose from the reel, will turn on the water automatically; and it consists, principally, of arms arranged to swing from a horizontal to a vertical position, upon or around which arms the hose is coiled, and of devices that, on removing the hose-nozzle from its holders, will automatically uncouple the arms to swing and release the hose to drop upon the floor; also, in a connection between the hose-holding arms and a stand-pipe valve, by which, on dropping the hose, the water will be turned on automatically, all as will be more fully hereinafter described and specifically claimed.

Figure 1:
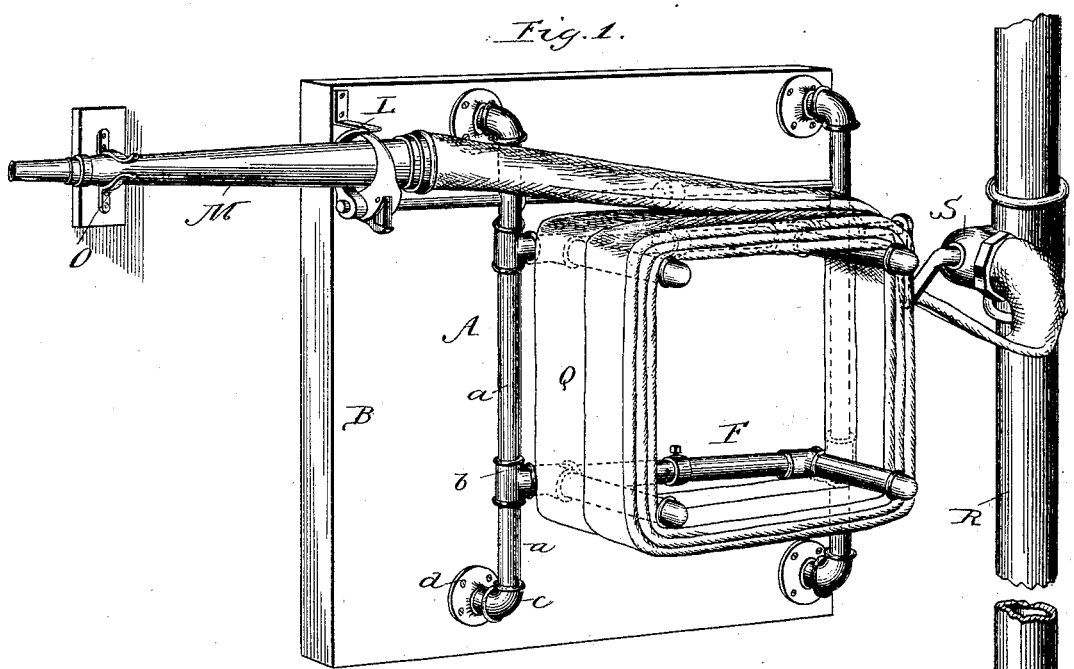
Figure 2:
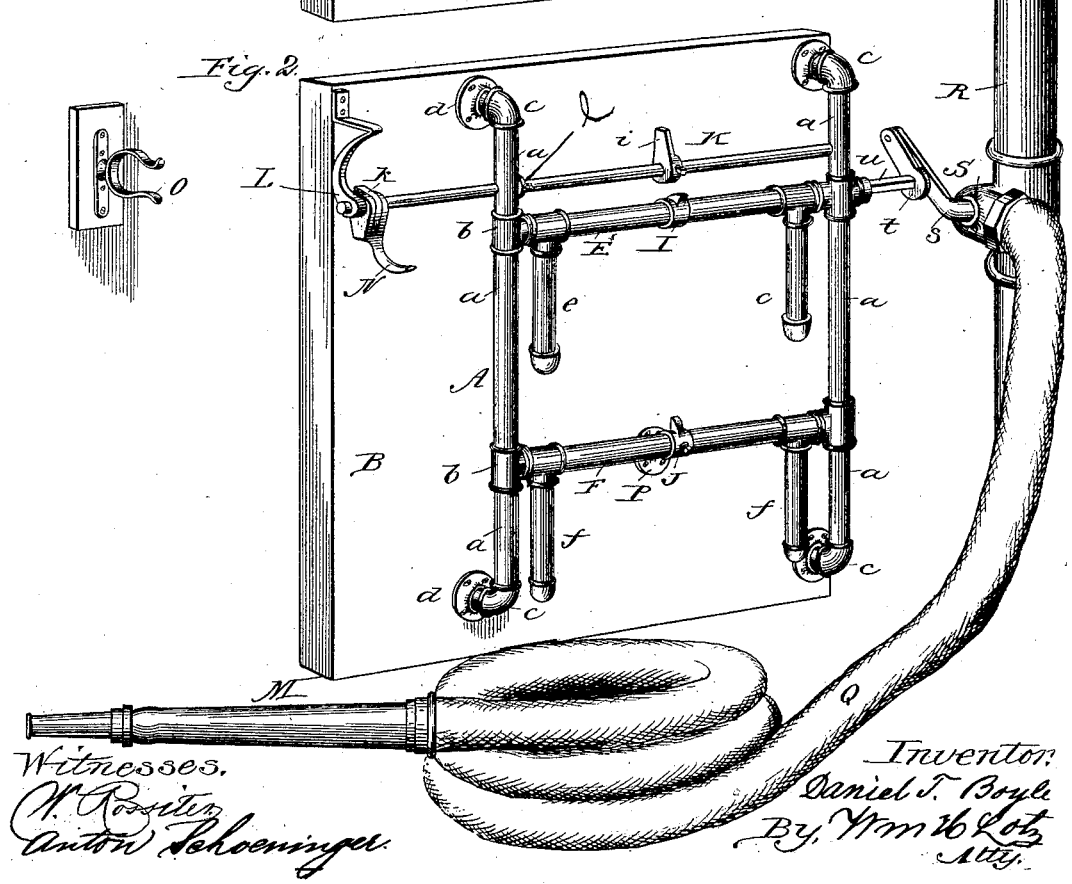
Figure 3:
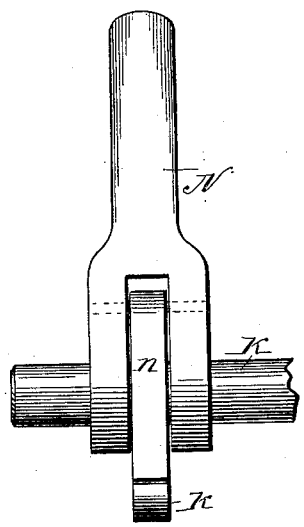
Figure 3:
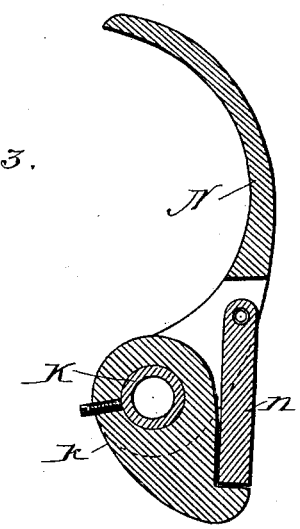
Figure 4:
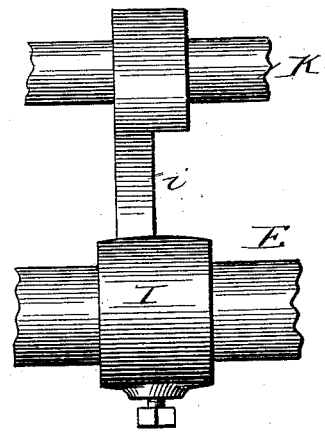
Figure 4:
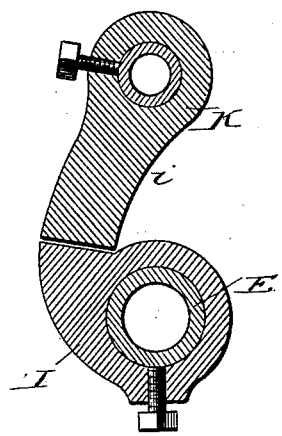
Figure 5:
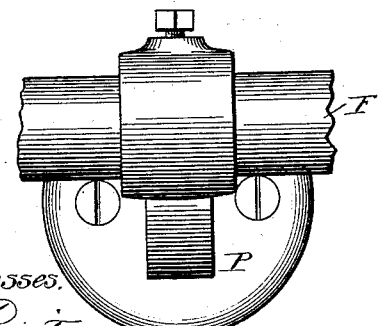
Figure 5:
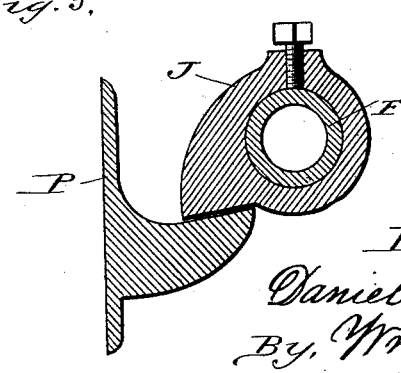

In the accompanying drawings, Figure 1 represents a perspective view of my reel with the hose wound thereupon; Fig. 2, a similar view of the reel after disconnecting the hose; and Figs. 3, 4, and 5 represent elevations and vertical sections of parts detached.

Corresponding letters in the several figures of the drawings designate like parts.

A and A' denote two standards secured against a wall-board, B, and constituting the frame for the reel. These standards, for convenience, and for making them light and yet strong, I have composed of wrought-iron pipe-sections $a$, connected by T-couplings $b$, and with their ends to elbow-couplings $c$, that again are connected to disk-plates $d$, secured by wood-screws against the wall-board B. Between these standards A A' and into T-couplings $b$ are pivotally secured two horizontal shafts, E and F, each provided with two radial arms, $e$ and $f$, secured to near the ends of such shafts. These shafts and their arms are also made of pieces of wrought-pipe connected by T-couplings, and the end of the arms are closed by acorn-shaped caps, screwed thereupon. Upon the center of each shaft E and F is sleeved, and secured by a set-screw, a cam-collar, I and J.

Above shaft E and parallel therewith is projected through a hole in standard A a shaft, K, one end of which is socketed in standard A' and the other end is journaled in a bracket, L, forming one-half of the clasp for holding the coupling end of the hoze-nozzle M. This shaft K, I also prefer to make of pipe, and for holding it laterally in position I secure upon it a collar, $l$, that bears against standard A.

Upon shaft K is secured, by a set-screw, a crank, $i$, engaging with the toe of cam I of shaft E, for sustaining such shaft on a position that its arms $e$ will be on a horizontal line. Adjacent to bracket L is secured upon shaft K, by a set-screw, a hook-cam, $k$, and the bifurcated hub portion of a curved arm, N, is loosely sleeved upon such shaft, embracing hook-cam $k$, which arm forms the outer half of the clasp for holding the coupling end of the hose-nozzle M, and between the hub-shanks of such arm is pivoted a dog, $n$, that will engage with the hook of cam $k$ for sustaining the arm N on its upright position. The pointed end of nozzle M is held in a V-shaped spring-clasp, O, secured upon a separate wooden block fastened against the wall. On turning shaft F to raise its arms to a horizontal position its cam J will butt against the lug of a plate, P, secured against the wall-board B by wood-screws, and will prevent the arms from being raised above the horizontal line. The arms $e$ being locked on their horizontal position by crank $i$, engaged with cam I, the hose Q is wound upon these arms and under arms $f$, that are suspended by the hose to be on their horizontal position, and the nozzle M is placed into clasp O and between bracket L and curved arm N, which latter, on being turned upward against such nozzle M, will be locked on its vertical position by dog $n$ engaging with cam-hook $k$, and when such hose is to be used by grasping and removing the nozzle, the arm N, being turned away, will rotate shaft K with crank $i$, which latter thereby will be disengaged from cam I, whereby shaft E is released for its arms $e$ to swing downward and the hose suspended thereon to drop to the floor, whence, on pulling it along, it will straighten out.

The hose Q may be permanently coupled to the stand-pipe R or to a valve or faucet, S, secured to such stand-pipe, and to this valve S the shaft E may be coupled in such a manner that, on releasing such shaft, the dropping of arms $e$ by the weight of the hose will open such valve to turn on the water. In the drawings I have shown one such device that may be applied, in which the faucet S is provided with a crank, $s$, for operating it, and which crank is coupled to a crank, $t$, mounted upon a shaft, $u$, that is a rigid extension of shaft E. By this arrangement, as will be seen, the rotating motion of shaft E, with its arms turning from a horizontal to a vertical position, will be transmitted to the faucet or valve. However, I do not wish to be restricted to this particular construction, since, according to the relative positions of the hose-reel and stand-pipe valve, the connections may require a different arrangement.

It will be readily seen that the above-described hose-reel has many advantages over rotary reels, it being more simple, cheaper to manufacture, takes up less room, is easier to attach, is less liable to get out of order, and the hose is quicker unwound and therefore more ready for immediate use.

What I claim is—

1. In a hose-reel, the shaft E F, having arms $ef$ and cam I, and the shaft K, having crank $i$, substantially as and for the purpose set forth.

2. In a hose-reel, the shaft E, having arms $e$ and cam I, and the shaft K, having crank $i$, in combination with shaft F, having arms $f$, and cam J, engaging with the lug of a plate, P, all substantially as and for the purpose set forth.

3. In a hose-reel, the shaft E, having arms $e$ and cam I, and shaft F, having arms $f$, in combination with shaft K, having crank $i$, hook-cam $k$, and arm N, with dog $n$, all constructed and arranged substantially as and for the purpose set forth.

4. In a hose-reel, the combination of the following elements, viz: shaft E, having arms $e$ and cam I, and shaft F, having arms $f$, shaft K, having crank $i$, hook-cam $k$, and arm N, with dog $n$, bracket L, and clasp O, the whole being constructed and arranged substantially as described, to operate as specified.

5. In a hose-reel, the combination of the following elements, viz: shaft E, having arms $e$ and cam I, shaft K, having crank $i$, hook-cam $k$, and arm N, with dog $n$, bracket L, clasp O, shaft F, with arms $f$ and cam J, and plate P, the whole being constructed and arranged substantially as described, to operate as specified.

In testimony whereof I affix my signature in presence of two witnesses.

DANIEL T. BOYLE.

Witnesses:
ANTON SCHOENINGER,
HARRIS W. HUEHL.